June 4, 1968  G. L. DUGGER ET AL  3,386,249

FUEL INJECTION PYLONS

Filed Jan. 10, 1964

GORDON L. DUGGER
FREDERICK S. BILLIG
INVENTORS

BY
Claude Funkhouser
ATTORNEY

3,386,249
FUEL INJECTION PYLONS
Gordon L. Dugger and Frederick S. Billig, Silver Spring, Md., assignors to the United States of America as represented by the Secretary of the Navy
Filed Jan. 10, 1964, Ser. No. 337,108
8 Claims. (Cl. 60—270)

This invention relates generally to ramjet engines; more particularly it relates to an improved external burning ramjet engine employing projecting pylons through which fuel is supplied to operate the engine.

Conventional ramjet engines consist of a cylindrical duct within which air is compressed and fuel is injected and burned, and out of which the resultant reaction gases flow through a conventional exhaust nozzle. Such engines have received widespread use and perform satisfactorily for most applications. However, while there is no theoretical limit upon the speeds attainable therewith, it has been found that the increasingly high temperatures present within the duct as speeds extend further into the supersonic range pose cooling problems which place a practical limit on the usefulness of such conventional ramjets. In an attempt to simplify the ramjet engine and to solve the problems associated with cooling the engine structure at high speeds, the external burning ramjet engine has recently been conceived.

In its simplest form the external burning ramjet engine consists of an inverted wedge, the wedge being defined by a front compression ramp and a rear expansion ramp, both said ramps being inclined downwardly from the horizontal with the confronting edges thereof defining the peak, or knee, of the inverted wedge. The engine is flown in a supersonic airstream, and the front ramp functions as an external diffuser to compress the air flowing thereover. Fuel is added to the compressed airflow just ahead of the knee and is burned under the rear ramp. The burning gases expand under said rear expansion ramp, thereby creating lift and thrust.

While the simple external burning ramjet is easy to cool, the efficiency of its operation is much below what is desirable. This low efficiency can mainly be attributed to a low pressure recovery from the supersonic airstream and to the limited amount of fuel that can be mixed with the air. The latter is especially critical, since in the simple inverted wedge ramjet the fuel is actually injected only into the relatively thin boundary layer of air lying near the engine's surface, and hence a considerable amount of the compressed airstream is not utilized for combustion.

In the present invention projecting diamond-shaped pylons are affixed to the surface of the inverted wedge ramjet. The pylons not only serve to increase greatly the amount of pressure recovered from the supersonic airstream, but also function as a means to inject fuel into a substantial area of that airstream. The ramjet engine of the invention is thus capable of producing thrust and lift several times greater than is obtainable from the simple inverted wedge external burning ramjet engine.

The principal object of this invention, therefore, is to provide an external burning ramjet engine so constructed as to be capable of producing relatively great amounts of thrust and lift.

Another object of the invention is to provide an external burning ramjet engine employing projecting pylons, and so constructed that said pylons function to greatly increase the amount of pressure recovered from a supersonic airstream moving over the engine and provide an efficient means for injecting fuel into said airstream.

Further objects of the invention are to provide a highly efficient external burning ramjet engine that is simple and economical of construction, and that is relatively easy to cool.

Other objects and many of the attendant advantages of the invention will be readily appreciated as the same becomes better understood by reference to the following detailed description when considered in connection with the accompanying drawings, wherein.

Figure 1:
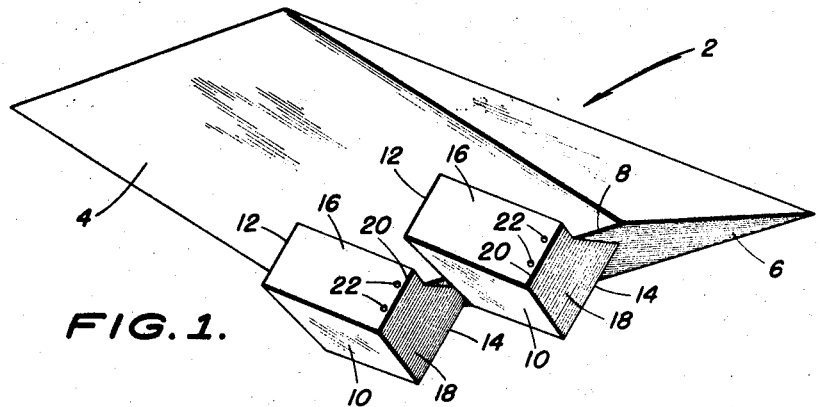
FIG. 1 is a bottom perspective view of the ramjet engine of the invention.

The ramjet engine of the present invention includes a front downwardly inclined ramp, a rear upwardly inclined ramp in abutment with said front ramp, and a pair of diamond-shaped in cross-section pylons affixed to both said ramps and projecting normal to said front ramp. Each pylon has ports on opposite sides thereof through which fuel may be ejected. The engine is designed for best operation at a specified supersonic velocity. When it is flown at this design velocity an oblique bow shock wave is formed and attaches to the leading edge of the engine, the major portion of the projecting pylons lying between said bow shock wave and the body of the engine. After passing through said bow shock wave, air flowing over the engine impinges upon the leading edge of each pylon, creating pairs of oblique shock waves. The air then passes through these latter shock waves, fuel is added thereto, and the resultant mixture burns to completion under the rear ramp, producing lift and thrust.

Referring now to the drawings, a ramjet engine is indicated at 2 and includes a front downwardly inclined ramp 4 and a rear upwardly inclined ramp 6, said ramps abutting at 8 to define a knee. A pair of pylons 10 are affixed to the ramps 4 and 6 and are generally diamond-shaped in cross-section. Each pylon 10 has a leading edge 12 disposed normal to the front ramp 4, and a trailing edge 14 that is parallel to said leading edge, the leading edge 12 of each pylon being defined by a pair of diverging plane surfaces 16 and the trailing edge 14 being defined by a pair of converging plane surfaces 18.

The surfaces 16 and 18 abut to define a line 20, and each surface 16 has a row of ports 22 therein positioned parallel to and just ahead of said line 20, a like number on each side of each pylon. The ports 22 are each connected with a fuel control system and fuel tanks (not shown), which may be disposed either within the body of the engine or within the vehicle to which the engine is attached.

The particular angular relationships employed in the engine depend to a great extent upon the velocity at which the engine is designed to operate, the fuel employed, and numerous other well-known factors. By way of example, however, for an engine designed for operation at Mach 5 and utilizing a self-igniting fuel such as triethyl aluminum, the angle A of the front ramp might be 10 degrees, the angle B of the rear ramp might be 20 degrees, and the angles of divergence C and convergence D of the surfaces 16 and 18 might be 30 degrees and 40 degrees, respectively.

In operation, the ramjet engine 2 is secured to the under surface of a suitable vehicle, which vehicle is then boosted by a suitable rocket or other similar type engine to a velocity at which the engine is designed to best operate. At booster termination the ramjet engine of the invention commences to operate.

Figure 2:
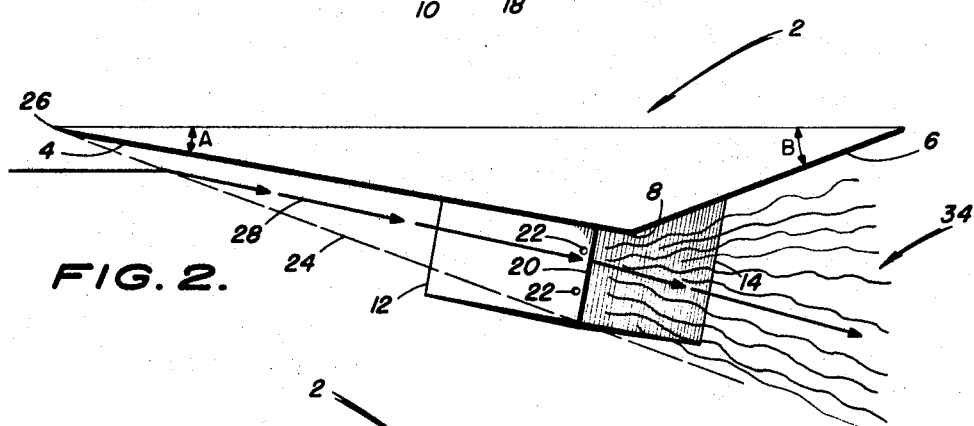
FIG. 2 is a side elevation of the engine, with its operation being indicated in diagrammatic form.
Figure 3:
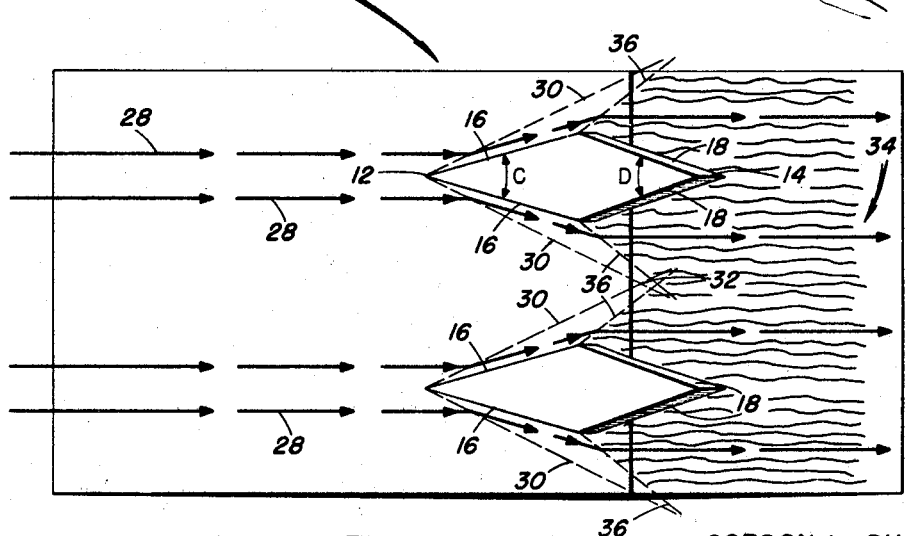
FIG. 3 is a bottom plan view of the invention, showing the operation of the pylons in diagrammatic form.

When the engine 2 is moving at design velocity, say Mach 5, an oblique bow shock wave 24 (FIG. 2) is formed and becomes attached to the leading edge 26 of said engine. Air moving over the engine, represented by arrows 28, passes through the shock wave 24 and is deflected to flow parallel to the ramp 4, its pressure is increased, and its velocity, though still supersonic, is decreased. The air then impinges upon the leading edges 12 of the pylons 10, and a pair of oblique shock waves 30 are formed and attach to each said leading edge (FIG. 3). The pylons are spaced apart a distance such that the oblique shock waves 30 disposed therebetween will intersect at a point 32 positioned near the knee 8 of the engine, and a sufficient number of pylons are employed such that the outermost shock waves 30 will extend beyond the width of the engine. The air flow 28 moving over the engine thus must pass through one of the shock waves 30 as well as through the bow shock wave 24, which causes the airstream to again be deflected with an accompanying pressure increase and velocity decrease.

Fuel is then injected into the airstream through the ports 22, and the resultant mixture burns under the rear ramp 6, as is indicated by wavy lines 34. The burning gases create a third set of oblique shock waves 36, through which the fuel-air mixture must pass to reach the burning zone 34. Again, an increase in pressure and decrease in velocity occurs.

In summary, it is seen that air flowing over the engine must flow through the bow shock wave 24, the oblique shock waves 30, and the flame induced oblique shock waves 36 before being consumed under the rear ramp 6. Each time the air passes through an oblique shock wave its pressure is increased and its velocity, although still supersonic, is decreased. The vertical rows of fuel ports 22 inject fuel across the compressed airstream, thus utilizing all but a small portion thereof. The resultant thrust and lift forces produced by the engine are several times greater than can be obtained from the simple inverted wedge external burning ramjet engine, while the cooling advantages of the latter resulting from heat radiation to the surrounding air are retained. It is thus seen that the fuel injection pylons of the subject invention constitute a major advance in external burning ramjets.

Obviously, many modifications and variations of the present invention are possible in the light of the above teachings. It is therefore to be understood that within the scope of the appended claims the invention may be practiced otherwise than as specifically described.

What is claimed is:

1. An external burning ramjet engine, comprising
   (A) ramp means located in a supersonic air stream for diffusing said air,
   (B) pylon means connected to and projecting from said ramp means for further diffusing said air, and
   (C) fuel injection means for injecting fuel into said further diffused air.
2. The device of claim 1, wherein said ramp means comprises a wedge-shaped portion having a compression ramp and an expansion ramp.
3. The device of claim 1, wherein said ramp means comprises a wedge-shaped portion having a front downwardly inclined compression ramp and a rear upwardly inclined expansion ramp in abutment with said front ramp.
4. The device of claim 1, wherein said pylon means includes a portion having a diamond-shaped cross-section, said pylon means having a leading edge in confronting relationship with said supersonic airstream.
5. The device of claim 4, wherein said ramp means comprises a wedge-shaped portion having a compression ramp and an expansion ramp and one portion of said pylon means is connected to said compression ramp and another portion of said pylon means is connected to said expansion ramp.
6. The device of claim 2, wherein said pylon means includes a leading edge disposed normal to said compression ramp and a trailing edge disposed adjacent said expansion ramp.
7. The device as recited in claim 1, wherein said fuel injection means includes ports formed in said pylon means.
8. The device as recited in claim 2, wherein said fuel injection means includes ports formed in said pylon means adjacent said compression ramp.

References Cited
UNITED STATES PATENTS

| | | | |
|---|---|---|---|
| 2,995,317 | 8/1961 | Schoppe | 60—35.6 |
| 3,008,669 | 11/1961 | Tanczos et al. | 60—35.6 |

MARTIN P. SCHWADRON, *Primary Examiner.*

SAMUEL FEINBERG, *Examiner.*

D. HART, *Assistant Examiner.*